US011905844B2

(12) United States Patent
Kim et al.

(10) Patent No.: US 11,905,844 B2
(45) Date of Patent: Feb. 20, 2024

(54) EXHAUST DUCT ASSEMBLY WITH IMPROVED WELD ZONE STRUCTURE AND AIRCRAFT INCLUDING THE SAME

(71) Applicant: HANWHA AEROSPACE CO., LTD., Gyeongsangnam-do (KR)

(72) Inventors: Young Hun Kim, Changwon-si (KR); Jun Su Song, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 106 days.

(21) Appl. No.: 17/545,133

(22) Filed: Dec. 8, 2021

(65) Prior Publication Data

US 2022/0205369 A1 Jun. 30, 2022

(30) Foreign Application Priority Data

Dec. 28, 2020 (KR) ........................ 10-2020-0185215

(51) Int. Cl.
*F01D 25/30* (2006.01)

(52) U.S. Cl.
CPC ........ *F01D 25/30* (2013.01); *F05D 2220/323* (2013.01); *F05D 2230/232* (2013.01)

(58) Field of Classification Search
None
See application file for complete search history.

(56) References Cited

U.S. PATENT DOCUMENTS 2,628,067 A * 2/1953 Lombard .............. F01D 25/145 415/177
7,762,086 B2 7/2010 Schwark
8,183,494 B2 * 5/2012 Bien ....................... F02B 67/10 219/121.45
8,549,861 B2 10/2013 Huffman
9,151,208 B2 * 10/2015 Schumnig ............... F01N 13/10
9,188,024 B2 11/2015 Tardif
9,291,123 B2 3/2016 Roberge
9,915,228 B2 3/2018 Peters et al.
2011/0236197 A1 9/2011 Burmeister et al.
2019/0145284 A1 * 5/2019 Lee ........................... F02C 6/18 165/52
2019/0226360 A1 * 7/2019 Santais ................... F01D 25/30
2022/0065147 A1 * 3/2022 Sugaya ............... F01N 13/1805

FOREIGN PATENT DOCUMENTS

EP 2905227 B1 3/2019

* cited by examiner

*Primary Examiner* — Kayla Mccaffrey
(74) *Attorney, Agent, or Firm* — Sughrue Mion, PLLC

(57) ABSTRACT

An exhaust duct assembly includes: a case having an inner space; a duct inserted into an inner space of the case, the duct including an inlet through which an exhaust gas is introduced, and an exhaust port through which the exhaust gas is exhausted; a stiffener configured to attach the duct to the case; and a connector disposed on the exhaust port, wherein the duct, the stiffener and the connector are welded to one another such that at least a portion of each of the duct, the stiffener and the connector overlaps one another in a first direction.

11 Claims, 5 Drawing Sheets

EXHAUST DUCT ASSEMBLY WITH IMPROVED WELD ZONE STRUCTURE AND AIRCRAFT INCLUDING THE SAME

CROSS-REFERENCE TO RELATED APPLICATION

This application is based on and claims priority from Korean Patent Application No. 10-2020-0185215, filed on Dec. 28, 2020, in the Korean Intellectual Property Office, the disclosure of which is incorporated by reference herein in its entirety.

BACKGROUND

1. Field

The present disclosure relates to an exhaust duct assembly and an aircraft including the same, and more particularly, to an exhaust duct assembly having an improved weld zone structure and an aircraft including the same.

2. Description of the Related Art

An exhaust duct is included in an aircraft's turbo-prop engine, turbo-fan engine, or turbo-shaft engine to exhaust an exhaust gas that has passed through a turbine to an outside. The exhaust duct is arranged at the rear of a low pressure turbine (power turbine) based on the direction of movement of the exhaust gas. The exhaust gas passing through the low pressure turbine is exhausted to the outside while passing through the exhaust duct.

Because the exhaust gas of high temperature and high pressure passes through the exhaust duct, mechanical and thermal loads are applied to the exhaust duct. Therefore, the exhaust duct must satisfy a high level of structural stability, especially stress conditions under high temperature and high pressure conditions.

Meanwhile, the exhaust duct includes a guide structure for guiding and moving the exhaust gas discharged from the turbine and a fix structure for fixing the guide structure, and these structures are welded together. However, in the related art, as these structures are welded several times, the time and cost required for welding increase, and because two different thin structures are welded to each other, sufficient structural stability is not achieved.

The above-mentioned background art is technical information that the inventor has for the purpose of derivation of the present disclosure or acquired in the process of derivation of the inventive concept, and cannot necessarily be said to be a known technique disclosed to the general public prior to the present disclosure.

SUMMARY

Various embodiments may address the above problems, and provide an exhaust duct assembly that may improve a lifespan thereof and an aircraft including the same by improving a weld zone structure of the exhaust duct assembly to prevent stress from being concentrated locally in the weld zone structure.

However, these problems are exemplary, and the problems to be addressed by the present embodiments are not limited thereto.

Additional aspects will be set forth in part in the description which follows and, in part, will be apparent from the description, or may be learned by practice of the presented embodiments of the disclosure.

According to embodiments, there is provided an exhaust duct assembly that may include: a case having an inner space; a duct inserted into an inner space of the case, the duct including an inlet through which an exhaust gas is introduced, and an exhaust port through which the exhaust gas is exhausted; a stiffener configured to attach the duct to the case; and a connector disposed on the exhaust port, wherein the duct, the stiffener and the connector are welded to one another such that at least a portion of each of the duct, the stiffener and the connector overlaps one another in a first direction.

In the exhaust duct assembly, the duct, the stiffener and the connector may be sequentially disposed in the first direction.

In the exhaust duct assembly, the exhaust port may have an exhaust port connection end, wherein the stiffener has a stiffener connection end disposed outside the exhaust port connection end in the first direction, wherein the exhaust port connection end and the stiffener connection end are welded to each other to form a first welding part, and the first welding part is positioned inside the exhaust part connection end and the stiffener connection end.

In the exhaust duct assembly, the connector may have a connector connection end disposed on the outside of the stiffener connection end in the first direction, wherein the stiffener connection end and the connector connection end are welded to each other to form a second welding part, and the second welding part is disposed inside the stiffener connection end and the connector connection end.

In the exhaust duct assembly, the connector may include a step structure by which a thickness of the connector connection end is smaller than a thickness of a connector body of the connector.

In the exhaust duct assembly, the exhaust port connection end and the stiffener connection end may be accommodated in a space provided by the step structure on an inner surface of the connector connection end.

In the exhaust duct assembly, the first welding part and the second welding part may be arranged to overlap in the first direction.

According to embodiments, there is provided an aircraft that may include: a gas turbine engine and an exhaust duct assembly for exhausting exhaust gas discharged from the gas turbine engine to an outside, wherein the exhaust duct assembly includes: a case having an inner space; a duct inserted into an inner space of the case, the duct including an inlet through which an exhaust gas is introduced, and an exhaust port through which the exhaust gas is exhausted; a stiffener configured to attach the duct to the case; and a connector disposed on the exhaust port, wherein the duct, the stiffener and the connector are welded to one another such that at least a portion of each of the duct, the stiffener and the connector overlaps one another in a first direction.

Other aspects, features, and advantages other than those described above will become apparent from the following detailed description, claims and drawings for carrying out the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
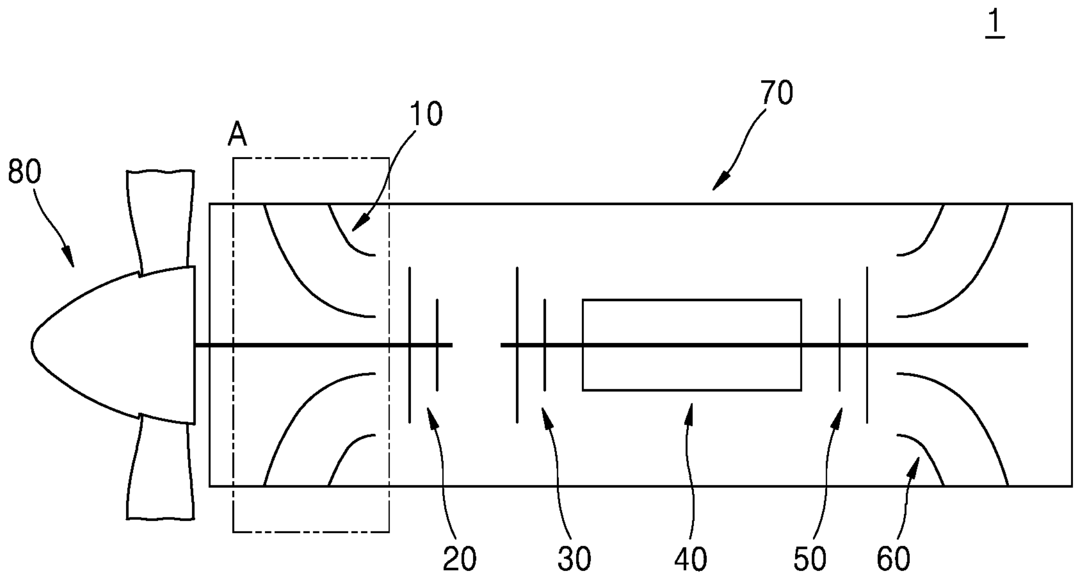
FIG. 1 shows an exhaust duct assembly and a gas turbine engine including the same, according to an embodiment.

Reference will now be made in detail to embodiments illustrated in the accompanying drawings, wherein like reference numerals refer to like elements throughout. In this regard, the present embodiments, all of which are example embodiments, may have different forms and should not be construed as being limited to the descriptions set forth herein. Accordingly, the embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The embodiment presented herein are not intended to limit the inventive concept to those embodiments, and should be understood to include all modifications, equivalents and substitutes thereof.

In the following embodiments, terms such as first and second are not used in a limiting meaning, but for the purpose of distinguishing one component from another component.

In the following embodiment, the singular expression includes the plural expression unless the context clearly indicates otherwise.

In the following embodiments, terms such as include or have means that the features or elements described in the specification are present, and do not preclude the possibility of adding one or more other features or elements in advance.

In the drawings, structures or components may be exaggerated or reduced in size for convenience of description. For example, the size and thickness of each structure or component shown in the drawings are arbitrarily shown for convenience of description, and thus the inventive concept is not necessarily limited to what is shown.

In the following embodiments, the x-axis, the y-axis, and the z-axis are not limited to three axes on a Cartesian coordinate system, and may be interpreted in a broad sense including them. For example, the x-axis, y-axis, and z-axis may be orthogonal to each other, but may refer to different directions that are not orthogonal to each other.

When a certain embodiment may be implemented differently, a specific process order may be performed differently from the described order. For example, two processes described in succession may be performed substantially simultaneously, or may be performed in an order opposite to the described order.

Figure 2:
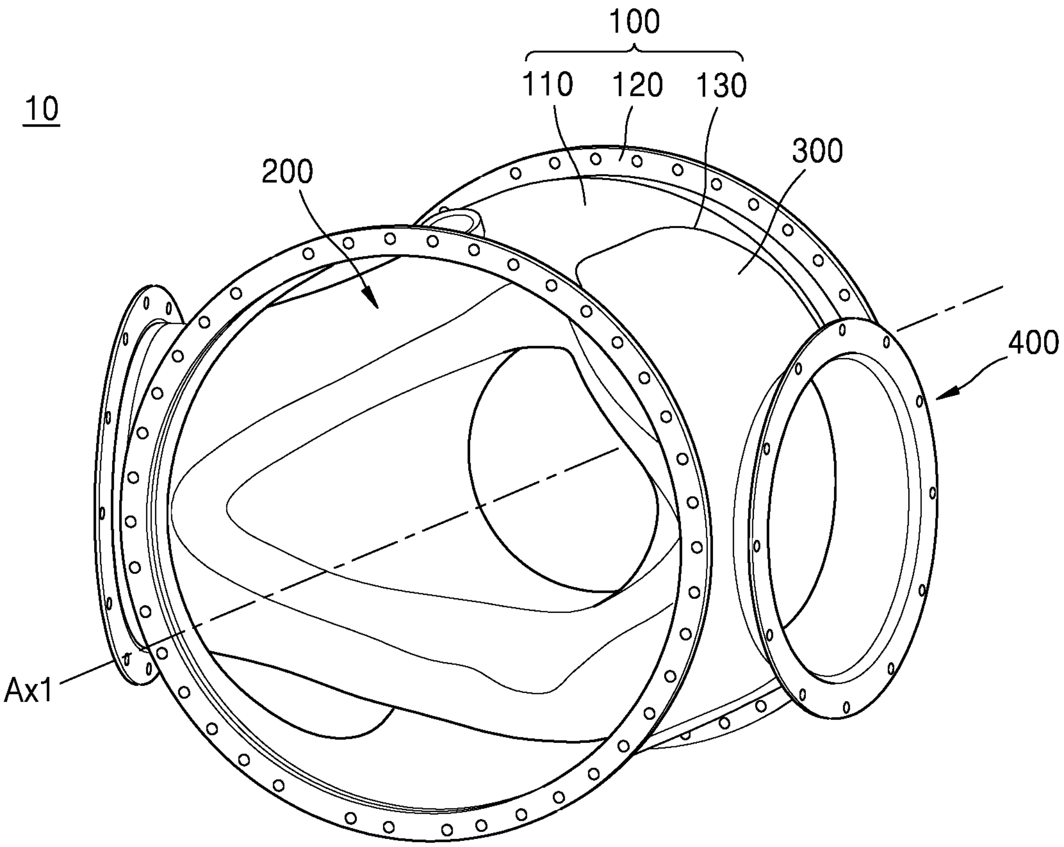
FIG. 2 shows the exhaust duct assembly of FIG. 1, according to an embodiment.
Figure 3:
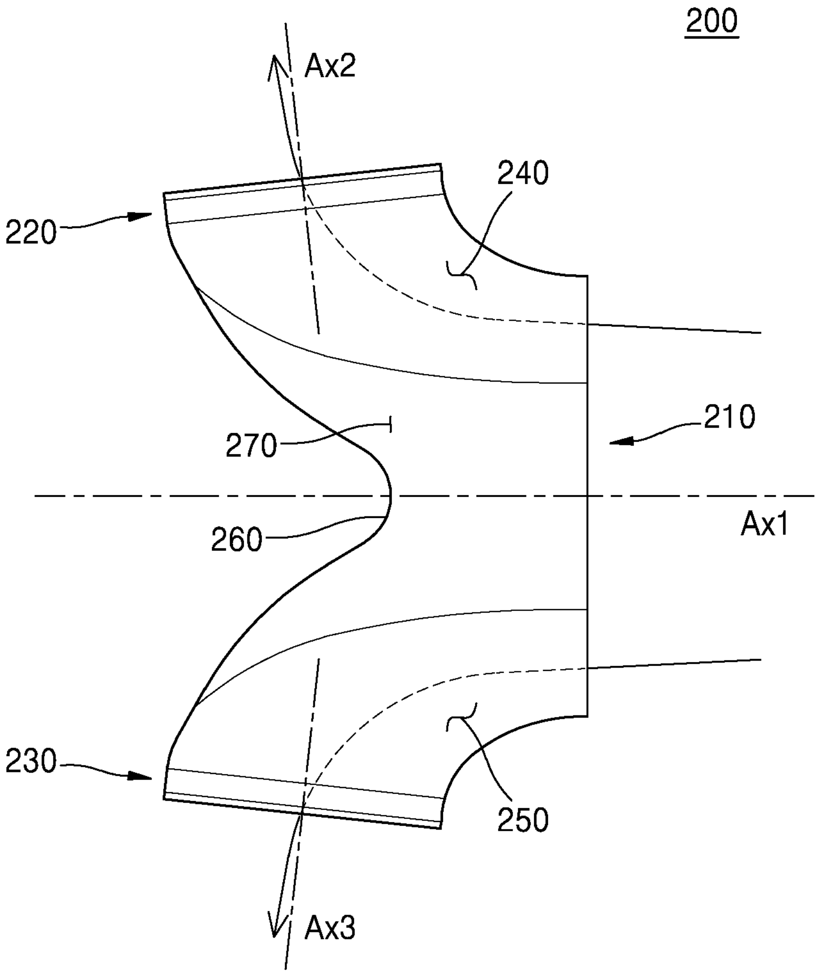
FIG. 3 shows an exhaust duct, according to an embodiment.
Figure 4:
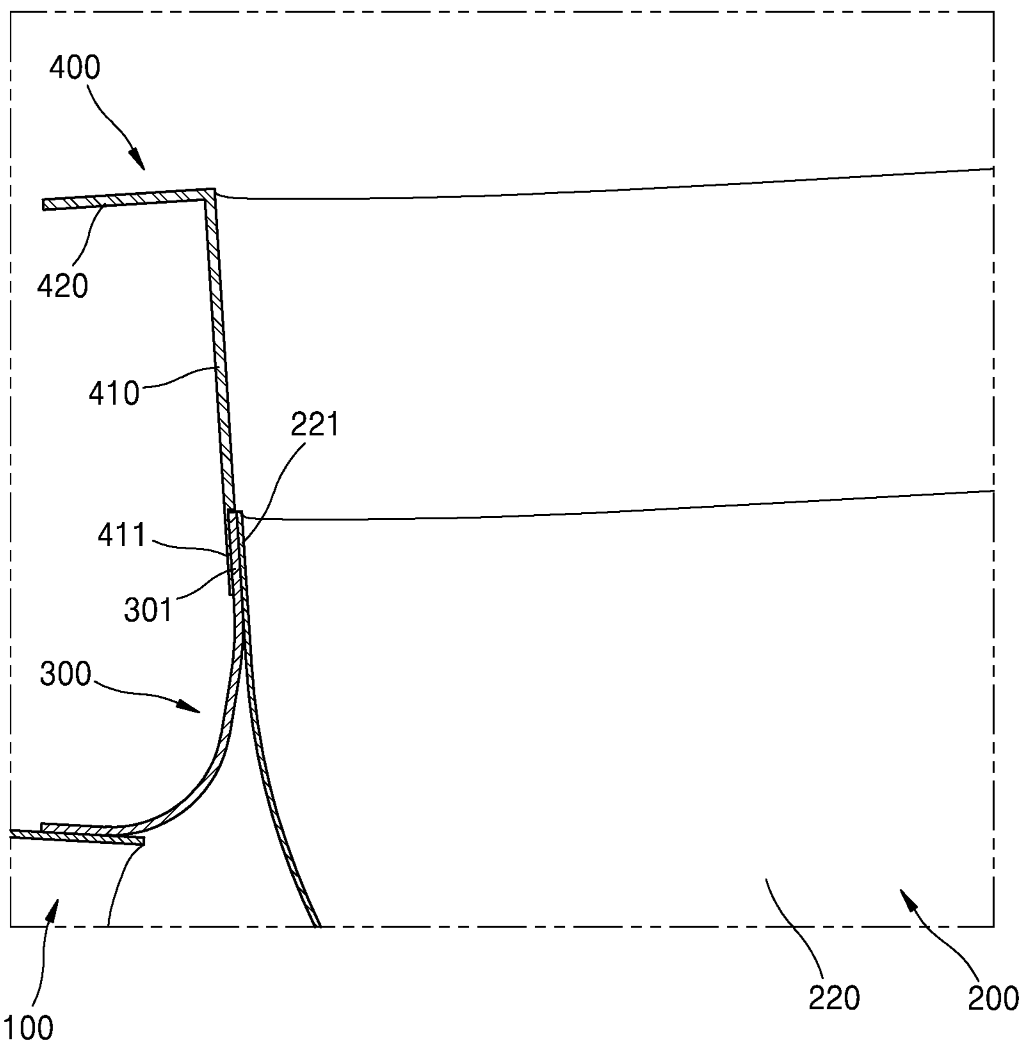
FIG. 4 shows an enlarged view of the exhaust duct assembly shown in FIGS. 1 and 2, according to an embodiment.
Figure 5:
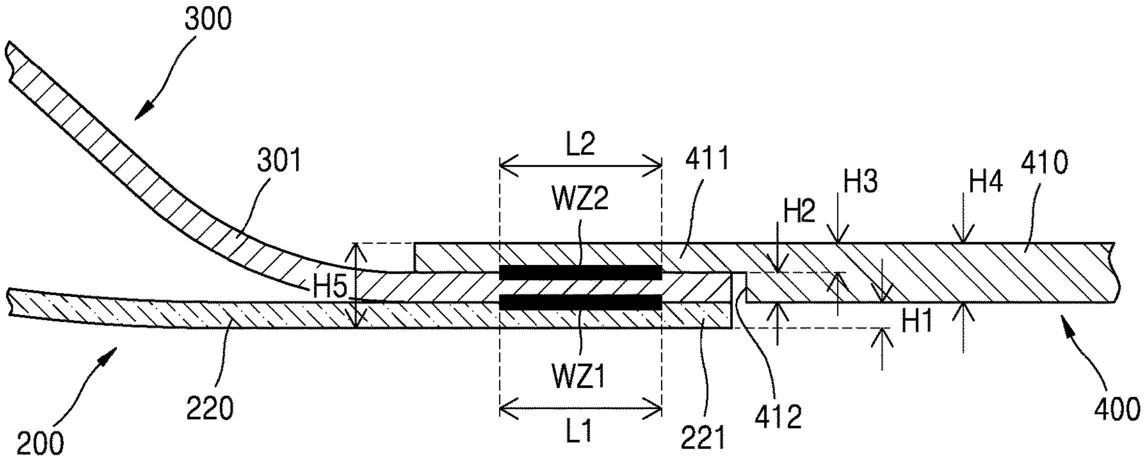
FIG. 5 shows a welding part of an exhaust duct assembly, according to an embodiment.
Figure 6:
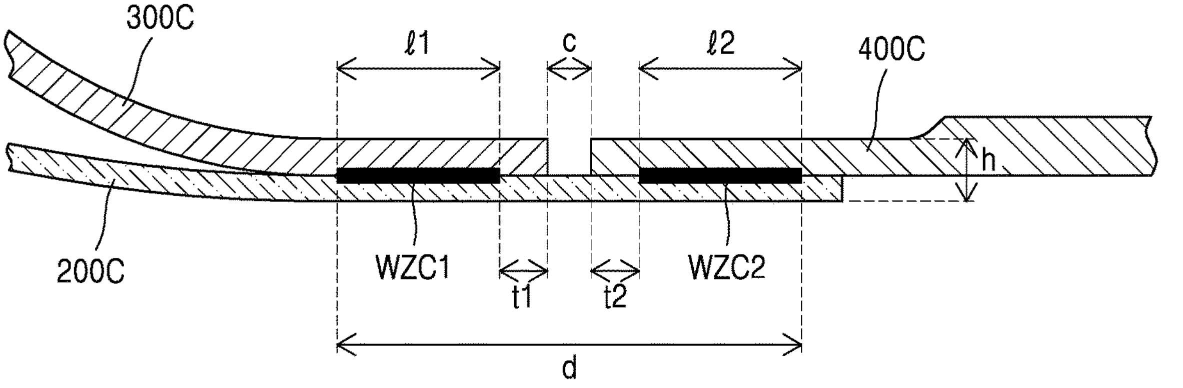
FIG. 6 shows a welding part of an exhaust duct assembly, according to a comparative example.

FIG. 1 shows an exhaust duct assembly 10 and a gas turbine engine 1 including the same, according to an embodiment, FIG. 2 shows the exhaust duct assembly 10 according to an embodiment, FIG. 3 shows an exhaust duct 200 according to an embodiment, FIG. 4 shows an enlarged view of the exhaust duct assembly 10, according to an embodiment, FIG. 5 shows a welding part of the exhaust duct assembly 10, according to an embodiment, and FIG. 6 shows a welding part of an exhaust duct assembly according to a comparative example.

Referring to FIG. 1, the exhaust duct assembly 10 according to an embodiment may be applied to the gas turbine engine 1 of an aircraft. For example, the gas turbine engine 1 may be a turbo-prop engine of the aircraft. The gas turbine engine 1 may include the exhaust duct assembly 10, a low-pressure turbine (power turbine) 20, a high-pressure turbine 30, a combustor 40, a compressor 50, an intake duct 60, a nacelle 70, and a propeller 80.

First, outside air introduced through the intake duct 60 passes through the compressor 50 and the combustor 40, and is in a state of high temperature and high pressure. Next, the outside air is expanded through the high-pressure turbine 30 and is supplied to the low-pressure turbine 20. The low-pressure turbine 20 is driven by the supplied outside air, and the low-pressure turbine 20 and the propeller 80 connected to the low-pressure turbine 20 through a drive shaft rotate. In addition, the air that has exited the low-pressure turbine 20 is exhausted to an outside through the exhaust duct assembly 10.

The exhaust duct assembly 10 is disposed inside the nacelle 70, and exhausts the exhaust gas passing through the low-pressure turbine 20 to the outside of the aircraft. That is, the exhaust duct assembly 10 may be disposed in the low-pressure turbine part of the gas turbine engine 1. In one embodiment, a part of the drive shaft and/or the low-pressure turbine 20 may be disposed inside the exhaust duct assembly 10.

The type of aircraft including the exhaust duct assembly 10 and the gas turbine engine 1 including the exhaust duct assembly 10 is not particularly limited. The aircraft may be an unmanned or manned aircraft.

The exhaust duct assembly 10 according to an embodiment may include a case 100, a duct 200, a stiffener 300, and a connector 400.

The case 100 may be used to couple the exhaust duct assembly 10 to the aircraft or another structure. The case 100 may have an inner space such that the duct 200 to be described later is disposed therein. For example, the case 100 may have a hollow cylindrical shape, and the inner surface thereof may be arranged to cover at least a portion of an outer surface of the duct 200. The case 100 may attach the exhaust duct assembly 10 to one side of the nacelle 70, and prevent the exhaust duct assembly 10 from interfering with or colliding with other structures.

In an embodiment, the case 100 may include a case body 110, a case flange 120, and a mounting hole 130.

The case body 110 has an inner space in which the duct 200 is disposed, and may have a cylindrical shape as an embodiment. The case body 110 may be integrally formed or may be formed by combining a plurality of segments. For example, the case body 110 may be formed by combining parts divided by a predetermined number along the circumferential direction. However, hereinafter, for convenience of description, a case in which the case body 110 is integrally formed will be mainly described.

The case flange 120 may be disposed on one side of the case body 110. For example, as shown in FIG. 2, the case flange 120 may be disposed at both ends of the case body 110 in the circumferential direction.

The mounting hole 130 may be disposed in both sides of the case body 110 so that a first exhaust port 220 and a second exhaust port 230 of the duct 200 are respectively disposed. For example, as shown in FIG. 2, the mounting hole 130 may be formed by cutting a portion of both sides of the case body 110. The shape or number of mounting holes 130 is not particularly limited, and may be appropriately selected according to the number of exhaust ports of the duct 200.

Referring to FIGS. 2 and 3, the duct 200 is disposed inside the case 100, and exhausts the exhaust gas discharged from the gas turbine engine 1 to the outside. For example, the duct 200 may include a flow path for exhausting the exhaust gas that has passed through the low-pressure turbine 20 to the outside.

In one embodiment, the duct 200 may have a symmetrical shape about the central axis Ax1. Here, the central axis Ax1 may be a central axis of the exhaust duct assembly 10 and/or the duct 200.

In one embodiment, the duct 200 may include an inlet 210, a first exhaust port 220, a second exhaust port 230, a first flow path 240, a second flow path 250, a splitter 260, and a mounting bore 270.

The inlet 210 is disposed to face the low-pressure turbine 20 for discharging the exhaust gas, and introduces the exhaust gas passing through the low-pressure turbine 20 into the interior of the duct 200. The exhaust gas introduced into the inlet 210 may move through the first exhaust port 220 and the second exhaust port 230. In one embodiment, the inlet 210 may have a ring shape having Ax1 as a central axis.

The first exhaust port 220 may be formed to extend from the inlet 210 to one side. The first exhaust port 220 exhausts a portion of the exhaust gas introduced from the inlet 210 to the outside. In one embodiment, the first exhaust port 220 may have a ring shape having a central axis Ax2.

The second exhaust port 230 may be formed extending from the inlet 210 to the other side. The second exhaust port 230 exhausts the rest of the exhaust gas introduced from the inlet 210 to the outside. In one embodiment, the second exhaust port 230 may have a ring shape having a central axis Ax3.

In one embodiment, a virtual line extending the central axis Ax2 of the first exhaust port 220 and the virtual line extending the central axis Ax3 of the second exhaust port 230 may be arranged to cross each other. That is, the central axis Ax2 and the central axis Ax3 may be disposed not to be parallel to each other.

In one embodiment, the duct 200 may have a Y-shape. More specifically, in the duct 200, the first exhaust port 220 and the second exhaust port 230 extending from one inlet 210 may be oriented in different directions. In addition, a side of the duct 200 opposite to the inlet 210 may be depressed toward the inlet 210 to have a recessed shape.

The first flow path 240 is an inner space partitioned by the inlet 210 and the first exhaust port 220. The exhaust gas introduced into the inlet 210 is exhausted to the outside through the first exhaust port 220 through the first flow path 240 (upper arrow in FIG. 3).

The second flow path 250 is an inner space partitioned by the inlet 210 and the second exhaust port 230. The exhaust gas introduced into the inlet 210 is exhausted to the outside through the second exhaust port 230 through the second flow path 250 (a lower arrow in FIG. 3).

In an embodiment, the duct 200 may include a splitter 260. The splitter 260 may be disposed between the first exhaust port 220 and the second exhaust port 230, that is, a portion recessed from the duct 200 toward the inlet 210. The splitter 260 is disposed to face the inlet 210, and may collide with the exhaust gas introduced from the inlet 210. The exhaust gas colliding with the splitter 260 is branched into the first flow path 240 and the second flow path 250, respectively, and may be exhausted through the first exhaust port 220 and the second exhaust port 230.

In one embodiment, the duct 200 may include a mounting bore 270. The mounting bore 270 is formed in the central axis Ax1 direction, and is an inner space defined by the inner surface of the duct 200. The mounting bore 270 may have the same central axis Ax1 as the duct 200, and the driving shaft of the gas turbine engine 1 may be disposed inside the mounting bore 270.

In FIGS. 2 and 3, the duct 200 is shown as a dual exhaust duct having one inlet 210 and two exhaust ports (the first exhaust port 220 and the second exhaust port 230), but the inventive concept is not limited thereto. The number of inlet and exhaust ports may vary according to conditions. However, below, for convenience of explanation, the exhaust duct assembly 10 including one inlet 210, the first exhaust port 220, and the second exhaust port 230 will be mainly described, and other structures will also be described based on the above configuration.

The stiffener 300 may be disposed on an outer surface of the case 100 to attach the duct 200 to the case 100. More specifically, as shown in FIGS. 2 and 4, the stiffener 300 has a funnel shape, and one side thereof may be disposed to surround the outer circumferential surface of the first exhaust port 220, and the other side may be disposed at the periphery of the mounting hole 130 of the case 100.

In an embodiment, the stiffener 300 may be provided in a number corresponding to the number of exhaust ports. Hereinafter, it will be mainly described that the stiffener 300 is disposed around the first exhaust port 220 and the second exhaust port 230, respectively.

The connector 400 may be disposed on one side of the duct 200 to attach the exhaust duct assembly 10 to one side of the gas turbine engine 1. For example, the connector 400 may be disposed above the first exhaust port 220 of the duct 200. In addition, the connector 400 may have one side connected to the inner side of the nacelle 70 to support the exhaust duct assembly 10 and/or the duct 200 to the nacelle 70.

In an embodiment, the connector 400 may include a connector body 410 and a connector flange 420.

The connector body 410 is a hollow cylindrical structure, and may be disposed to contact the outside of the exhaust port. For example, as shown in FIG. 4, the connector body 410 is disposed so that an inner surface thereof is in contact with an outer surface of the first exhaust port 220, and may extend in an exhaust direction of the exhaust gas. Although only the first exhaust port 220 is shown in FIG. 4, another connector body corresponding to the connector body 410 may also be disposed on the second exhaust port 230.

The connector flange 420 may extend radially outward from one end of the connector body 410 and be mounted on another structure.

In an embodiment, at least a portion of the duct 200, the stiffener 300, and the connector 400 may be attached to one another. For example, the duct 200, the stiffener 300, and the connector 400 may be coupled to one another by welding.

In an embodiment, the duct 200, the stiffener 300, and the connector 400 may be arranged such that at least respective portions of these three structures overlap one another. For example, as shown in FIG. 5, the duct 200, the stiffener 300, and the connector 400 are welded, and all these three structures may be arranged to overlap one another in a first direction (e.g., a radial direction of the first exhaust port 220 or the connector 400). Accordingly, a welding part overlaps in the first direction, thereby reducing an overall size of the exhaust duct assembly 10 by minimizing an area occupied by the welding part.

In an embodiment, the duct 200, the stiffener 300, and the connector 400 may be sequentially disposed to overlap one another in one direction. For example, as shown in FIG. 5, the duct 200 may be disposed on the innermost side, the stiffener 300 may be disposed on the outer surface of the duct 200, and the connector 400 may be disposed on an outer surface of the stiffener 300.

The duct 200 is a structure that may be heated to the highest temperature among a plurality structural elements of the exhaust duct assembly 10 because the duct 200 is in direct contact with the high-temperature exhaust gas. In addition, because the connector 400 is disposed in a portion where the exhaust gas of which temperature is lowered while flowing through the duct 200 is exhausted, the temperature of the connector 400 is relatively lower than that of the duct 200. Therefore, when directly welding the connector 400 on the duct 200, excessive thermal stress may be concentrated on the welding part or a joint due to a temperature difference between the duct 200 and the connector 400.

In the exhaust duct assembly 10 according to an embodiment, after disposing a stiffener 300 that may be heated to a relatively higher temperature than the connector 400 on the outer surface of the duct 200, thermal stress concentrated on the welding part or the connection part may be reduced by disposing the connector 400 on the outer surface of the stiffener 300.

In an embodiment, the exhaust port of the duct 200 may include an exhaust port connection end connected to the stiffener 300. More specifically, as shown in FIGS. 4 and 5, the first exhaust port 220 may include a first exhaust port connection end 221 connected to a first stiffener connection end 301 to be described later. According to an embodiment, at least the first exhaust port connection end 221 in the first exhaust port 220 may have a thickness H1. Although only the first exhaust port 220 and the first exhaust port connection end 221 are shown in FIGS. 4 and 5, the second exhaust port 230 may also include a second exhaust port connection end corresponding to the second exhaust port connection end 221. Hereinafter, for convenience of explanation, the first exhaust port 220 will be mainly described.

In one embodiment, the stiffener 300 may include a stiffener connection end disposed on an outside of the first exhaust port connection end 221 in one direction. More specifically, as shown in FIGS. 4 and 5, the stiffener 300 may include the first stiffener connection end 301 disposed outside the first exhaust port connection end 221 in the first direction (e.g., in the radial direction of the first exhaust port 220 or the connector 400). According to an embodiment, at least the first stiffener connection end 301 in the stiffener 300 may have a thickness H2. Although only the first stiffener connection end 301 disposed on the first exhaust port connection end 221 is shown in FIGS. 4 and 5, a second stiffener connection end corresponding to the first stiffener connection end 301 may also be disposed on the second exhaust port connection end. Hereinafter, for convenience of description, the first stiffener connection end 301 disposed on the first exhaust port connection end 221 will be mainly described.

In an embodiment, the first exhaust port connection end 221 and the first stiffener connection end 221 may be welded to each other to form a first welding part WZ1. For example, as shown in FIGS. 4 and 5, the first stiffener connection end 301 may be disposed on an outer circumferential surface of the first exhaust part connection end 221 and welded to each other to form a first welding part WZ1. Here, the first welding part WZ1 may include an actual welded part and a welding heat affected zone (HAZ). In an embodiment, the first welding part WZ1 may have a length L1.

In an embodiment, the first welding part WZ1 may be positioned inside the first exhaust port connection end 221 and the first stiffener connection end 301. For example, as shown in FIGS. 4 and 5, the first welding part WZ1 formed by welding the first exhaust port connection end 221 and the first stiffener connection end 301 to each other may be positioned inside the first exhaust port connection end 221 and the first stiffener connection end 301 in a second direction (e.g., a longitudinal direction of the exhaust port or the connector 400) intersecting with the first direction.

In one embodiment, the connector 400 may include a connector connection end disposed on an outside of the first stiffener connection end 301 in one direction. For example, as shown in FIGS. 4 and 5, the connector body 410 of the connector 400 may include a first connector connection end 411 overlapping with the first stiffener connection end 301. According to an embodiment, the first connector connection end 411 may have a thickness H3, while the connector body 410 may have a thickness H4 which is thicker than the thickness H3. FIGS. 4 and 5 show only the first connector connection end 411 disposed in the first exhaust port 220 but the connector body 410 may further include a second connector connection end corresponding to the first connector connection end 411 disposed on the second exhaust port 230. Hereinafter, for convenience of description, the first connector connection end 411 disposed on the first exhaust port connection end 221 will be mainly described.

In an embodiment, the stiffener connection end 301 and the first connector connection end 411 may be welded to each other to form a second welding part WZ2. For example, as shown in FIGS. 4 and 5, the first connector connection end 411 is disposed on an outer circumferential surface of the first stiffener connection end 311 and welded to each other to form a second welding part WZ2. Here, the second welding part WZ2 may include an actual welded part and a welding HAZ. In an embodiment, the second welding part WZ2 may have a length L2.

In an embodiment, the second welding part WZ2 may be positioned inside the first stiffener connection end 301 and the first connector connection end 411. For example, as shown in FIGS. 4 and 5, the second welding part WZ2 formed by welding the first stiffener connection end 301 and the first connector connection end 411 to each other may be positioned inside the first stiffener connection end 301 and the first connector connection end 411 in a second direction (e.g., the longitudinal direction of the exhaust port or the connector 400) intersecting with the first direction.

In an embodiment, the connector 400 may include a step structure providing a space on an inner surface of the first connector connection end 411. For example, as shown in FIG. 5, the connector 400 may include a first step structure 412 formed by partially cutting a surface thereof so that the space provided by the first step structure 412 on the inner surface of the first connector connection end may accommodate the first exhaust port connection end 221 and the first stiffener connection end 301. FIG. 5 shows only the first step structure 412 disposed in the first exhaust port 220, but the connector 400 may further include a second step structure formed in the second exhaust port 230. Hereinafter, for convenience of explanation, the first step structure 412 will be mainly described.

As such, the first exhaust port connection end 221 and the first stiffener connection end 301 are accommodated in the space provided by the first step structure 412 on the inner surface of the first connector connection end 411, so that a thickness H5 of a weld area formed by the first exhaust port connection end 221, the first stiffener connection end 301, and the first step structure 412, which is a sum of the thicknesses H1, H2 and H3, may not be excessive. Referring to FIG. 5, the first step structure 412 is formed such that a sum of the thickness H3 of the first connector connection end 411 and the thickness H2 of the first stiffener connection end 301 is equal to or substantially equal to the thickness H4 of the connector body 410, in the present embodiment. However, one or more of the thicknesses H1, H2, H3 and H4 may be set differently as long as the sum of thicknesses of the weld area may be controlled not to be excessive, according to embodiments.

Here, reducing the thickness of the first connector connection end 411 from H4 to H3 by forming the first step structure 412 in the connector 400 may improve a welding quality of the first welding part WZ1 and the second welding part WZ2.

That is, when welding using an electrical resistance such as seam welding, the electrical resistance may be affected by thicknesses of base materials, and when the thicknesses of the base materials are different from each other, a welding quality may be deteriorated. In relation to the exhaust duct assembly 10 according to present embodiment, in a state in which shapes and dimensions of the duct 200, the stiffener 300, and the connector 400, which become base materials during welding, are determined, by forming the first step structure 412, a thickness deviation between the base materials may be reduced, thereby improving the welding quality.

In the present embodiment, the first welding part WZ1 and the second welding part WZ2 may be disposed to overlap each other. For example, as shown in FIG. 5, all or part of the first welding part WZ1 and the second welding part WZ2 may be disposed to overlap in the first direction (e.g., the radial direction of the exhaust port or the connector 400). Accordingly, by reducing an area occupied by the entire welding part in the second direction intersecting with the first direction, an overall size of the exhaust duct assembly 10 may be reduced.

In an embodiment, the length L1 of the first welding part WZ1 may be the same as the length L2 of the second welding part WZ2. Accordingly, the area occupied by the first welding part WZ1 and the second welding part WZ2 may be further reduced.

Through such a configuration, the exhaust duct assembly 10 according to the present embodiment may improve a lifespan of the exhaust duct assembly 10 by relieving concentration of local thermal stress applied to the welding part. In addition, a size of the exhaust duct assembly 10 may be reduced by reducing an overall length of the welding part. In addition, because the welding part may have a sufficient thickness, rigidity of the welding part may be increased.

More specifically, referring to FIG. 6 showing an exhaust duct assembly according to a comparative example, the comparative example does not have an area where all of a duct 200C, a stiffener 300C, and a connector 400C overlap. That is, the duct 200C and the stiffener 300C overlap each other, and the stiffener 300C and the connector 400C overlap each other, separately, but all three structures do not have an overlapping area. For this reason, a first welding part WZC1 formed by the duct 200C and the stiffener 300C and a second welding part WZC2 formed by the duct 200C and the connector 400C are arranged to be spaced apart from each other.

Therefore, a length d of an entire welding part has a sum of a length 11 of the first welding part WZC1 formed by the duct 200C and the stiffener 300C, a length 12 of the second welding part WZC2 formed by the duct 200C and the connector 400C, a distance c between the stiffener 300C and the connector 400C, a protruding part length t1 of the stiffener 300C, and a protruding part length t2 of the connector 400C. Therefore, an weld area occupied by the entire welding part becomes excessive, and an overall size of the exhaust duct assembly may be inevitably increased.

In addition, because the first welding part WZC1 formed by the duct 200C and the stiffener 300C and the second welding part WZC2 formed by the duct 200C and the connector 400C are spaced apart from each other, welding may not be completed in one welding process.

In addition, when thicknesses and shapes of the duct 200C, the stiffener 300C, and the connector 400C as the base material are determined, because the weld areas are formed with the duct 200C and the stiffener 300C, and the duct 200C and the connector 400C, respectively, each weld area has a thickness h. Therefore, it may not be possible to secure a sufficient thickness depending on conditions, so that rigidity of the welding part is lowered.

In addition, in the welding part where the duct 200C and the connector 400C are in direct contact, thermal stress is concentrated due to a temperature difference between the duct 200C and the connector 400C, which reduces a lifespan of the exhaust duct assembly as a whole.

On the other hand, in the exhaust duct assembly 10 according to the present embodiment, because the duct 200, the stiffener 300, and the connector 400 all overlap one another to form a weld area, a size occupied by the welding part may be minimized. Therefore, an overall size of the exhaust duct assembly 10 may also be reduced.

In addition, in the exhaust duct assembly 10 according to the present embodiment, because the first welding part WZ1 and the second welding part WZ2 are slightly spaced apart in the thickness direction, welding may be completed in one welding process.

In addition, in the exhaust duct assembly 10 according to the present embodiment, because the duct 200, the stiffener 300, and the connector 400 are arranged in this order, a temperature difference between the adjacent structures may be minimized to prevent concentration of thermal stress.

In the exhaust duct assembly 10 according to the present embodiment, by triple welding the duct 200, the stiffener 300, and the connector 400 to secure a sufficient thickness of the welding part, rigidity of the welding part may be increased.

As described above, the inventive concept has been described with reference to the embodiment shown in the drawings, but this is only an example. Those of ordinary skill in the art may fully understand that various modifications and equivalent other embodiments are possible from the present embodiments. Therefore, the true technical protection scope of the inventive concept should be determined based on the appended claims.

Specific technical content described in the embodiment is an embodiment and does not limit the technical scope of the embodiment. In order to concisely and clearly describe the description of the invention, descriptions of conventional general techniques and configurations may be omitted. In addition, the connection or connection structures of lines between the components shown in the drawings are illustrative of functional connections and/or physical or circuit connections, and may be represented as a variety of functional connections, physical connections, or circuit connections that are replaceable or additional in an actual device. In addition, if there is no specific mention such as "essential" or "importantly", it may not be an essential component for the application of the inventive concept.

In the description of the embodiments and in the claims, "above" or similar referents may refer to both the singular and the plural unless otherwise specified. In addition, when a range is described in an embodiment, it includes the inventive concept to which individual values within the range are applied (unless there is a description to the contrary), and each individual value constituting the range is described in the description of the inventive concept.

An exhaust duct assembly and an aircraft including the same according to the present embodiment may improve structural stability of an exhaust duct assembly by welding a duct, a stiffener and a connector while overlapping one another to prevent local concentration of thermal stress on the welded part.

An exhaust duct assembly according to the present embodiment and an aircraft including the same may secure a sufficient thickness while minimizing a size of the welding part, thereby reducing the exhaust duct assembly and improving rigidity of the welding part at the same time.

The exhaust duct assembly and the aircraft including the same according to the present embodiment may minimize time and cost required for the welding process.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An exhaust duct assembly comprising:

a case having an inner space;

a duct inserted into an inner space of the case, the duct comprising an inlet through which an exhaust gas is introduced, and an exhaust port through which the exhaust gas is exhausted;

a stiffener configured to attach the duct to the case; and a connector disposed on the exhaust port, wherein the duct, the stiffener and the connector are welded to one another such that at least a portion of each of the duct, the stiffener and the connector overlaps one another in a first direction, wherein the exhaust port has an exhaust port connection end, wherein the stiffener has a stiffener connection end disposed outside the exhaust port connection end in the first direction, and wherein the exhaust port connection end and the stiffener connection end are welded to each other to form a first welding part, and the first welding part is positioned inside the exhaust port connection end and the stiffener connection end.

2. The exhaust duct assembly of claim 1, wherein the duct, the stiffener and the connector are sequentially disposed in the first direction.

3. The exhaust duct assembly of claim 1, wherein the connector has a connector connection end disposed on the outside of the stiffener connection end in the first direction, wherein the stiffener connection end and the connector connection end are welded to each other to form a second welding part, and the second welding part is disposed inside the stiffener connection end and the connector connection end.

4. The exhaust duct assembly of claim 3, wherein the connector comprises a step structure by which a thickness of the connector connection end is smaller than a thickness of a connector body of the connector.

5. The exhaust duct assembly of claim 4, wherein the exhaust port connection end and the stiffener connection end are accommodated in a space provided by the step structure on an inner surface of the connector connection end.

6. The exhaust duct assembly of claim 3, wherein the first welding part and the second welding part are arranged to overlap in the first direction.

7. The exhaust duct assembly of claim 3, wherein the connector comprises a step structure formed on a connector body to provide a space in which the first welding part and the second welding part are accommodated on an inner surface of the connector connection end.

8. The exhaust duct assembly of claim 7, wherein a thickness of the connector connection end is smaller than a thickness of a connector body of the connector.

9. The exhaust duct assembly of claim 8, wherein a sum of a thickness of the exhaust port connection end and the thickness of the connector connection end is substantially equal to the thickness of the connector body of the connector.

10. An aircraft comprising a gas turbine engine and an exhaust duct assembly for exhausting exhaust gas discharged from the gas turbine engine to an outside, wherein the exhaust duct assembly comprises:

a case having an inner space;

a duct inserted into an inner space of the case, the duct comprising an inlet through which an exhaust gas is introduced, and an exhaust port through which the exhaust gas is exhausted;

a stiffener configured to attach the duct to the case; and a connector disposed on the exhaust port, wherein the duct, the stiffener and the connector are welded to one another such that at least a portion of each of the duct, the stiffener and the connector overlaps one another in a first direction.

11. The aircraft of claim 10, wherein the duct, the stiffener and the connector are sequentially disposed in the first direction.

* * * * *